UNITED STATES PATENT OFFICE.

JOHN W. WARE AND MARIA L. WARE, OF PHILADELPHIA, PENNSYLVANIA.

IMPROVEMENT IN THE PROCESSES OF BLEACHING, &c., DRIED NATURAL FLOWERS.

Specification forming part of Letters Patent No. 134,714, dated January 7, 1873.

*To all whom it may concern:*

Be it known that we, JOHN W. WARE, and MARIA L. WARE, of Philadelphia, in the county of Philadelphia and State of Pennsylvania, have invented a new and valuable Process for Bleaching and Restoring Fresh and Dried Natural Flowers; and we do hereby declare that the following is a full, clear, and exact description of the same.

Dissolve one-third of a pound of chloride of lime, mashed fine, in two quarts of cold water, and one pound of sal-soda in two quarts of boiling water. When cold mix both thoroughly together; let the mixture settle and pour off clear of sediment. Pick off the leaves of the flowers, and immerse them in this liquid, and subject them to a temperature of about 90° Fahrenheit for two hours, or until white. As the liquid becomes colored it must be poured off and renewed until the leaves are bleached, when they are lifted out and placed in cold water for an hour. Cover a piece of glass with tissue paper and spread the leaves thereon smoothly with a camel's-hair brush until the glass is full, which cover with a similar piece of paper, and slip all off the glass, and place in a book to dry. When dry they can be easily removed with a pen-knife, and are ready to be made up in natural form.

*Claim.*

The process herein described for bleaching natural flowers for preservation.

In testimony that we claim the above we have hereunto subscribed our names in the presence of two witnesses.

JOHN W. WARE.
MARIA L. WARE.

Witnesses:
JOHN B. BUCK,
W. H. BUCK.